(12) United States Patent
Marchand et al.

(10) Patent No.: US 6,590,967 B1
(45) Date of Patent: Jul. 8, 2003

(54) VARIABLE LENGTH CALLED NUMBER SCREENING

(75) Inventors: Dean C. Marchand, Brighton, CO (US); Arthur Lance Springer, Waterloo, IA (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/863,144

(22) Filed: May 23, 2001

(51) Int. Cl.[7] .................. H04M 15/00; H04M 17/00
(52) U.S. Cl. .............. 379/114.14; 379/145; 379/194
(58) Field of Search .............. 379/91.01, 91.02, 379/93.02, 114.04, 114.14, 115.03, 127.01, 127.02, 144.03, 145, 189, 194

(56) References Cited

U.S. PATENT DOCUMENTS

| 4,794,642 A | * | 12/1988 | Arbabzadah et al. | ....... 379/200 |
| 5,200,995 A | * | 4/1993 | Gaukel et al. | ............ 379/200 |
| 5,768,354 A | | 6/1998 | Lange et al. | ............... 379/189 |
| 5,805,686 A | | 9/1998 | Moller et al. | ............... 379/198 |
| 5,854,833 A | * | 12/1998 | Hogan et al. | ............... 379/112 |
| 5,875,236 A | * | 2/1999 | Jankowitz et al. | .......... 379/114 |

\* cited by examiner

*Primary Examiner*—Binh Tieu

(57) ABSTRACT

A system for preventing telecommunications fraud, the system comprising a database, at least one processor and related software, the at least one processor receives and stores numbers representing terminating ANIs in the database that have generated a fraud alert. The stored numbers include at least a portion of the terminating ANI and at least one variable length character, and are accessible to block subsequent calls directed at the respective terminating ANIs. The at least one processor receives a dialed terminating ANI representing a subsequently dialed call and checks the database to determine if the dialed terminating ANI matches a stored number. The at least one variable length character matches any corresponding character in the dialed terminating ANI. One variable length character may also match one or more subsequent characters in the dialed terminating ANI. A match between the dialed terminating ANI and a stored number initiate a block of the dialed call.

15 Claims, 4 Drawing Sheets

VARIABLE LENGTH CALLED NUMBER SCREENING

BACKGROUND OF THE INVENTION

1. Field of the Invention

The invention relates to preventing fraudulent access to a telecommunications system. In particular, the invention relates to identifying fraudulent calls directed at a particular telephone number (a "terminating automatic number indicator" or "terminating ANI") and blocking subsequent calls to that number.

2. Description of the Related Art

Fraud costs the telecommunications industry billions of dollars per year. There are many techniques used to perpetrate fraud. The fraud can be as simple as using a stolen credit card to charge a long distance call, or it can involve sophisticated looping techniques, such as repeatedly calling a private PBX system, finding the correct sequence to access an outside line (by trial and error or other hacking techniques) and then placing a costly long distance call through the PBX system. The telecommunications industry is involved in an intensive and ongoing effort to identify different types of fraud and then to develop and implement ways of preventing such fraud.

Fraud is more costly to certain telecommunications companies than others. For example, where a fraudulent call is directed at a company that owns the underlying telecommunications infrastructure, the cost of the call is less than the cost to an independent company that incurs access charges to the owner(s) of the infrastructure supporting the call, even if the call is fraudulent. In either case, however, the cost to the industry is significant.

Particular methods of fraud control and systems for implementing them are known in the industry. Fraud control may be divided conceptually into identifying a call that is likely to be fraudulent and responding after a call is identified as likely to be fraudulent.

Methods of identifying calls that are likely to be fraudulent vary from the simple to the sophisticated and are generally directed at a particular type of fraudulent activity. For example, a call is likely to be fraudulent if it is made using a calling card that has been reported stolen by the owner. A more sophisticated method of identifying fraudulent calls is described in U.S. Pat. No. 5,768,354, entitled "Fraud Evaluation and Reporting System and Method Thereof", which is owned by the assignee of the present invention. Fraudulent activity is identified in the '354 patent by monitoring the activity of a billing number, such as a calling card number or a credit card number. If certain patterns of calling are detected, an alert is generated. The alert can be analyzed and a decision may be made to block subsequent calls made using the billing number.

The '354 patent is directed at calls that require "special service", that is, which are placed through an operator or an automatic operation support system. Such calls generally require the caller to access an intelligent services network (ISN) of a telecommunications company through a particular number, such as an 800 access number, and then manually supply the billing number, such as by pressing numbers on a payphone, swiping the magnetic strip on a card or speaking with an operator.

The '354 patent and like techniques focus on preventing fraudulent calls perpetrated using the same billing number. Those involved in fraudulent activity, however, may use a number of different billing numbers (often stolen) in order to conceal their activity.

In such cases, where the billing number cannot be used to effectively block the fraud, the fraud must be prevented by another means, such as blocking the desired terminating ANI. There are therefore techniques of fraud detection and prevention that focus on calling patterns to a terminating ANI. A particular terminating ANI is often the focus of fraudulent activity. For example, an offender may make multiple calls to a general number of a PBX system in an attempt to hack into the system to obtain information or place a subsequent call. In addition, lengthy fraudulent calls are commonly made to a terminating ANI in a foreign country. The single call may be used to support successive conversations between persons at the originating ANI (located, for example, in New York City or Los Angeles) and their relatives located at the terminating ANI in the foreign country.

Detecting fraudulent calls directed at a terminating ANI may be accomplished by creating a called number record for each special service call, retrieving prior called number records for the terminating ANI when it is dialed, and generating a fraud alert if the called number records fall within a pre-programmed pattern suspected of being fraudulent.

For example, an alert may be generated if ten special service calls are placed to a terminating ANI within one hour. After such an alert is generated, the calling records may be transferred to a fraud analyst, who is trained to evaluate whether further action is required. For example, the fraud analyst may see that the terminating ANI is a paging service and that the calls are originating from a wide geographical range of originating numbers ("originating automatic number indicator" or "originating ANI"). The analyst may conclude that this is normal calling activity and take no further action. (The analyst may alternatively initiate an upward adjustment of the alarm level for that particular terminating ANI.) On the other hand, if the calls are being made to a business in the middle of the night, the analyst may conclude that someone is trying to hack into the business's PBX system.

U.S. Pat. No. 5,805,686, entitled "Telephone Fraud Detection System" and owned by the Assignee of the present invention, is directed at preventing fraudulent calling through private PBX systems. The '686 patent describes analyzing call detail records to and from a PBX in order to generate fraud alerts and, if appropriate, to block additional suspect calls through the PBX. Among other things, the '686 patent describes analyzing calling patterns to a called number (terminating ANI), in particular, the 800 number of a PBX.

As noted, once a fraud alert is generated for a terminating ANI, the response may be to block or otherwise intercept subsequent calls to that number. The determination may be made immediately after an alert is generated, or may be made after further analysis, such as analysis of calling records to the terminating ANI by a fraud operator.

FIG. 1 depicts components of a basic known system used to block calls to a terminating ANI where it has been determined that fraudulent calls are being placed to the terminating ANI. The system shown in FIG. 1 is part of a larger ISN platform. Fraud control center 18 has processor(s) and software that monitor calls placed to terminating ANIs over time. Fraud control center 18 includes analysis software that generates alerts of possible fraud based on the calling patterns to terminating ANIs, which may consider factors such as the location and type of originating ANI, the location and type of terminating ANI, the billing product used for the call, the frequency of calls to the terminating ANI, etc.

When possible fraud directed at a terminating ANI is detected, the software at the fraud control center 18 generates an alert. The data may be sent to a fraud analyst, who, after analyzing the data, may determine that a caller (or callers) are trying to fraudulently access the terminating ANI and set a fraud flag in the system. Alternatively, the software may set a fraud flag without any further inquiry. As shown in FIG. 1, fraud control center 18 interfaces with screening database 14. Terminating ANIs that have been flagged for fraudulent activity are stored in screening database 14. The storing of the terminating ANI in the screening database 14 may be considered setting the fraud flag.

The storage of data in the database 14, as well as the retrieval, comparison and other manipulation of data related to the database 14 described further below, is performed by one or more processors (or computers) and software (not shown) related with the database. For convenience, this is sometimes referred to as being performed by the database 14. This is just a shorthand, however, for a system that is comprised of the database 14, at least one processor (or computer) and associated software.

Not all calls to a terminating ANI are necessarily blocked. The fraud alert software and/or the fraud analyst may determine that a block to a terminating ANI is appropriate for special services calls placed using a particular type of billing product or products. Thus, a category or categories of billing products (such as calling cards, credit cards and/or pre-paid calling cards) may be blocked to a terminating ANI. Also, particular types of categories of billing products may be blocked. For example, where the category of the billing product for a billing number is a credit card, the type of card blocked may be Master Card, American Express, and/or Visa, etc. Where the category of the billing product for a billing number is MCI calling cards, for example, the type may be MCI Card, Telecom USA Card, PSCC Card, VNET Vision, etc. Thus, for example, the alert software and/or the fraud analyst may determine that the fraudulent calls placed to a terminating ANI are being attempted using a series of Visa numbers, and the block to the terminating ANI may be set in the screening database 14 for calls placed using Visa credit cards.

The call screening database 14 would thus flag the terminating ANI and, if appropriate, also reference the category (or categories) and/or type (or types) of billing product that is blocked to the terminating ANI. Where a terminating ANI is an international number, it may be stored in a separate portion of the screening database 14, such as an international part of the database. Calls made to terminating ANIs that begin with "011" would thus be flagged in this part of the database.

The flagged terminating ANIs stored in the database are used to screen or block subsequent calls to the terminating ANI. FIG. 1 depicts components of an ISN 10 that support special services calls. As previously noted, calls that require special services generally require the caller to manually supply a portable billing number (such as a credit card, calling card, prepaid phone card, supplying a home phone number for a third party call, etc.), such as by pressing numbers on a payphone, swiping the magnetic strip on a card or speaking with an operator. Special services of an ISN are typically accessed by a toll free or special access number, such as MCI Worldcomm's (800) 888-8000 access number.

A special service call is received by the ISN 10 through a manual telephone operator console (MTOC) 22 or an automatic response unit (ARU) 26.

The MTOC 22 and ARU 26 are connected to the screening database 14 in the ISN via ethernet rail 30. In FIG. 1, screening database 14 is depicted as directly interfacing with fraud control center 18, because they are typically located in the same physical facility. However, the MTOC 22 and ARU 26 may access the screening database 14 as if it were connected directly to the ethernet rail 30.

Before a special service call is connected by the MTOC 22 or ARU 26, the screening database 14 is checked to determine whether the terminating ANI is flagged therein. If the terminating ANI is flagged in the screening database, then the call may be blocked or otherwise intercepted. Where the terminating ANI stored in the database is further referenced by a category and/or type of billing product, then a call placed using the category and/or type of billing product to the terminating ANI is blocked. For an international call (that is, a call to a terminating ANI that begins with "011"), the international part of the screening database 14 is checked.

A disadvantage of the called number screening databases of the prior art was that persons involved in fraudulent calling could defeat the block of a terminating ANI by simply adding one or more "bogus" dialing characters at the end of the dialed number. For example, for a blocked terminating ANI of "800-555-1313", the hacker might dial "800-555-1313-5555". When the terminating ANI "800-555-1313-5555" was checked in the screening database 14, it would not be found because of the additional characters "5555". Thus, the system would allow the call to be connected. The switching hardware and software for connecting the call, however, would only process the first ten characters, thereby connecting the call to the terminating ANI "800-555-1313". Thus, by simply adding bogus numbers at the end of the terminating ANI, the block of the terminating ANI could be defeated.

SUMMARY OF THE INVENTION

It is an objective of the present invention to provide a system and method of blocking fraudulent calls to a terminating ANI, where the dialed number has additional bogus characters.

Accordingly, one embodiment of the invention provides a system for preventing telecommunications fraud, the system comprising a database, at least one processor and related software, the at least one processor receives and stores numbers representing terminating ANIs in the database that have generated a fraud alert. The stored numbers include at least a portion of the terminating ANI and at least one variable length character, and are accessible to block subsequent calls directed at the respective terminating ANIs. The at least one processor receives a dialed terminating ANI representing a subsequently dialed call and checks the database to determine if the dialed terminating ANI matches a stored number. The at least one variable length character matches any corresponding character in the dialed terminating ANI. One variable length character may also match one or more subsequent characters in the dialed terminating ANI. A match between the dialed terminating ANI and a stored number initiates a block of the dialed call.

Another embodiment of the invention comprises a system for preventing telecommunications fraud, the system including a database, at least one processor and associated software, the at least one processor receives and stores terminating ANIs in the database that have generated a fraud alert. The at least one processor also receives a dialed terminating ANI representing a subsequently dialed call and determines if leading characters of the dialed terminating ANI match a stored terminating ANI, regardless of subsequent characters in the dialed terminating ANI. A match between the dialed terminating ANI and a stored terminating ANI initiates a block of the dialed call.

Yet another embodiment of the invention comprises a system for preventing telecommunications fraud, the system comprising a database, at least one processor and associated software, the at least one processor receives and stores at least a portion of the characters of terminating ANIs in the database that have generated a fraud alert. The at least one processor also receives a dialed terminating ANI representing a subsequently dialed call and checks the database to determine if the dialed terminating ANI matches a stored terminating ANI. The match is determined if leading characters of the dialed terminating ANI correspond to the characters of a terminating ANI stored in the database. A match between the dialed terminating ANI and a stored terminating ANI initiates a block of the dialed call.

Another embodiment of the invention is a method of preventing fraud comprising the steps of receiving and storing at least some of the leading characters of terminating ANIs that have generated a fraud alert, receiving a dialed terminating ANI representing a subsequently dialed call, determining if the leading characters of the dialed terminating ANI match the characters of a terminating ANI stored in the database and initiating a block of the call if a match is determined.

Another embodiment of the invention is a method of preventing fraud comprising the steps of receiving and storing at least some of the leading characters of terminating ANIs that generate a fraud alert and at least one variable length character, receiving a dialed terminating ANI representing a subsequently dialed call, determining if the characters of the dialed terminating ANI and the stored characters of a terminating ANI match, the at least one variable length character matching any one or more characters of the dialed terminating ANI, and initiating a block of the call if a match is determined.

DETAILED DESCRIPTION OF THE PREFERRED EMBODIMENTS

Figure 1:
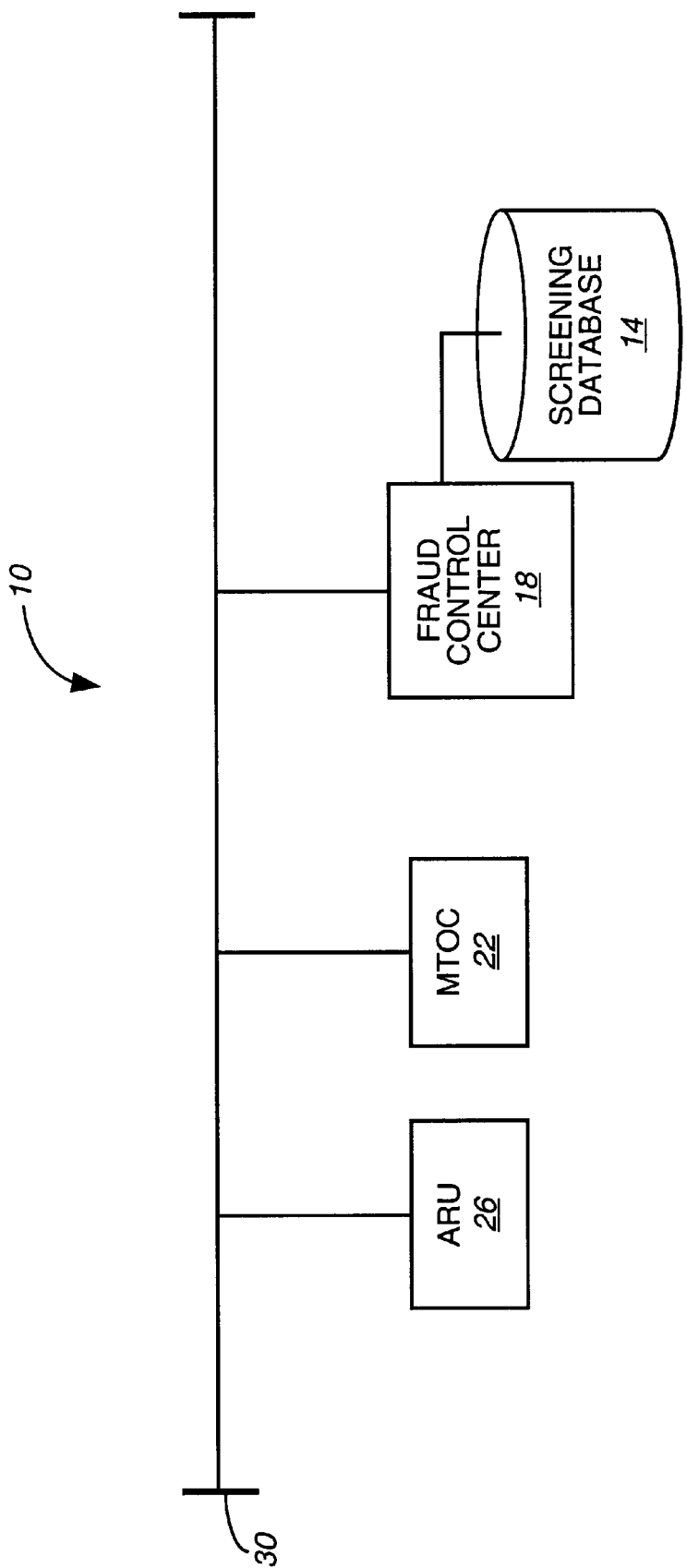
FIG. 1 is a block diagram of components of a known ISN having a screening database to block calls.
Figure 2:
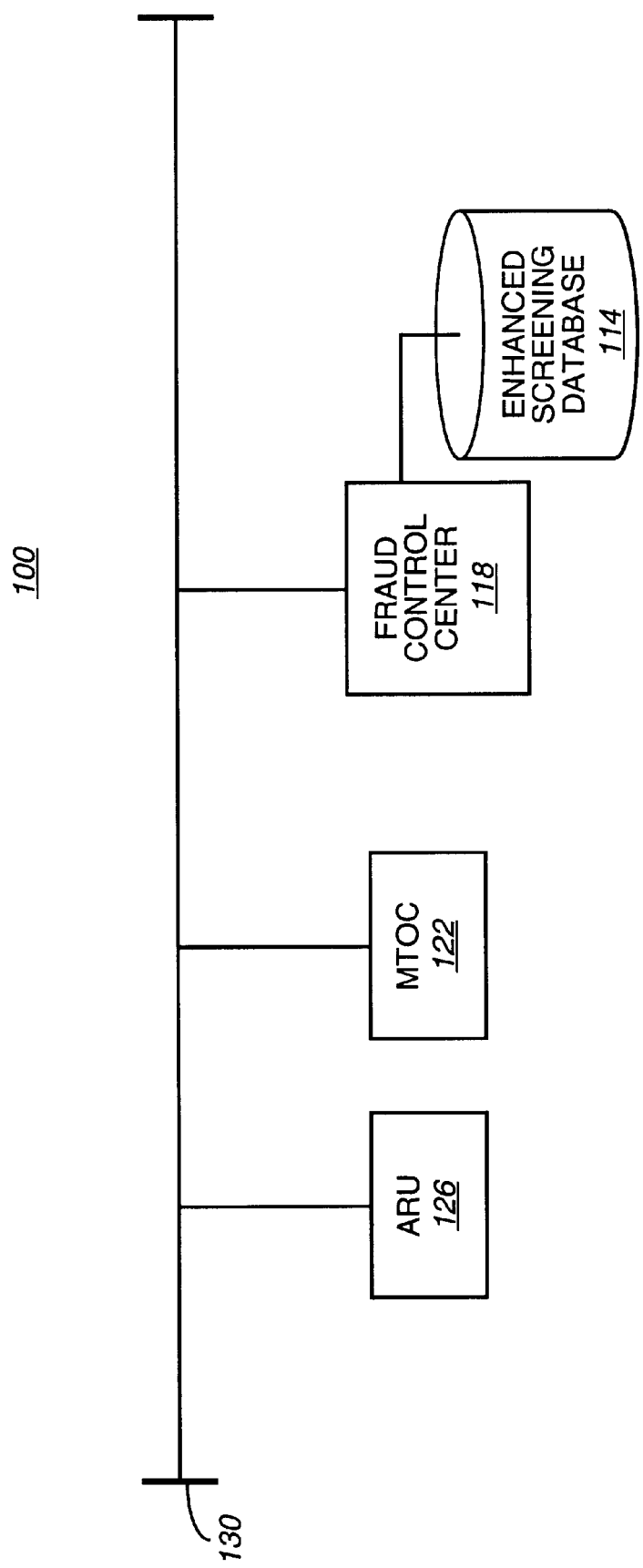
FIG. 2 is a block diagram of components of an ISN having a screening database with enhanced called number screening features in accordance with an embodiment of the invention.

FIG. 2 depicts components of an ISN 100 that support an embodiment of the present invention. FIG. 2 depicts an ARU 126 and an MTOC 122 that receive, process and connect special services calls, as described with respect to FIG. 1 above. ARU 126 and MTOC 122 are connected with fraud control center 118 via ethernet rail 130. Fraud control center interfaces with enhanced screening database 114. The enhanced screening database 114 may be accessed by the ARU 126 or MTOC 122 as if it were directly connected to the ethernet rail 130.

Fraud control center 118 receives and monitors called number (terminating ANI) data for special services calls placed through the ARU 126 and MTOC 122 over time. Fraud control center 118 may also receive and monitor called number data for other (non-special services) calls made via other components of the ISN 100. Fraud control center 118 has hardware and fraud detection software that generates an alert that a terminating ANI may be the target of fraudulent activity when the calling pattern to the terminating ANI meets certain threshold criteria of suspected fraudulent activity. As noted above, the threshold may be a particular number of calls to the terminating ANI in a certain period of time. Other patterns to a terminating ANI are described in the '686 patent noted above.

Once a fraud alert is generated with respect to a terminating ANI, the calling data may be referred to a fraud analyst, who may make the ultimate determination of whether or not to block the terminating ANI. The analyst may also determine, based on the data, to block the terminating ANI for a category (or categories) of billing products. The analyst may also determine to block the terminating ANI for a type (or types) of a category (or categories) of billing products. Alternatively, the software may block the terminating ANI immediately after an alert is generated, including blocking the terminating ANI by category and/or type.

Figure 3:
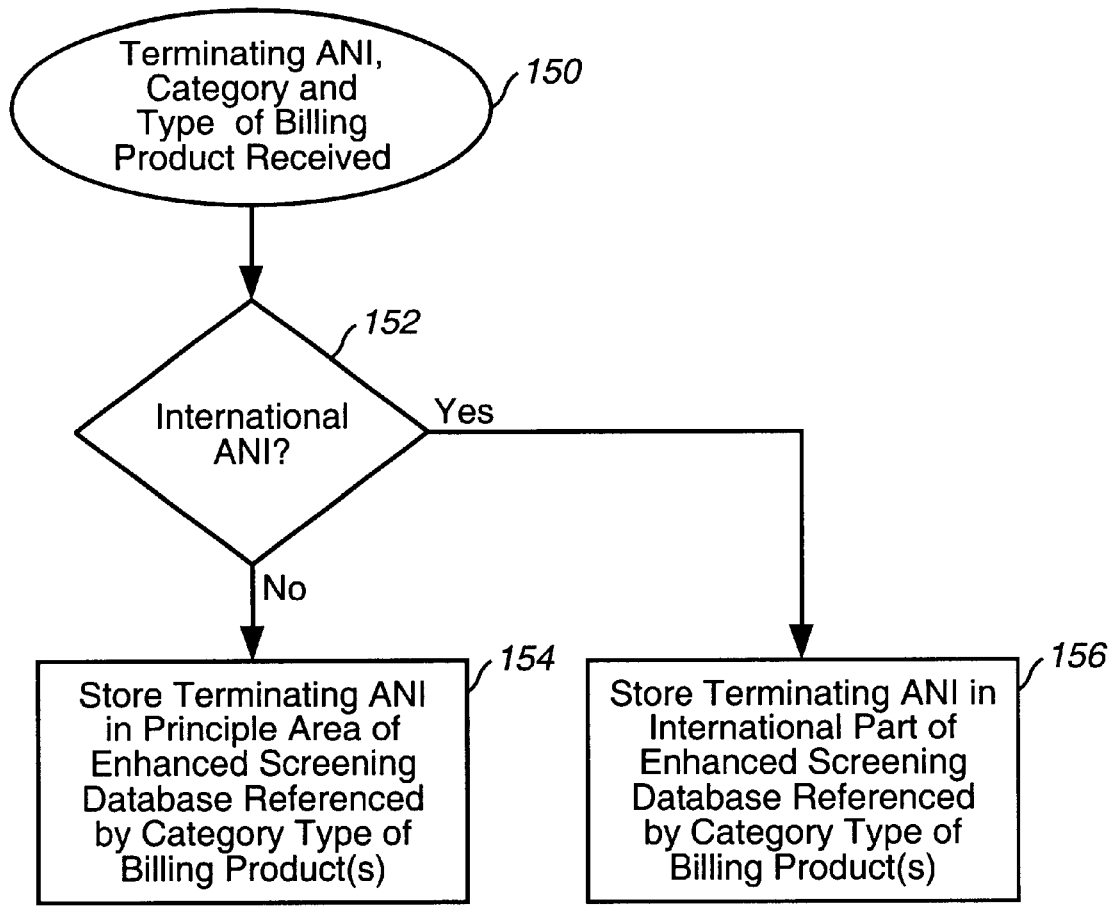
FIG. 3 is a flowchart of the processing to set a block for a terminating ANI in the screening database of FIG. 2.

Once a terminating ANI has been flagged for blocking, it is stored in the enhanced screening database 114. FIG. 3 is a flowchart of steps followed for storing a terminating ANI in the enhanced screening database 114 performed by one or more processors and related software associated with the database 114 (not shown). The terminating ANI and the category (or categories) and type (or types) of billing products blocked are transferred from the fraud control center 118 (step 150). As described above, the terminating ANI can be blocked for one or more billing products. It may also be blocked for all categories of billing products. In addition, the terminating ANI may be blocked for one or more types of a category of billing product, or for all types of a billing product.

Thus, for example, a terminating ANI may be blocked for all credit cards by transferring a category code "03" (identifying the "credit card" category) and a type code "00" (identifying "all" types) with the terminating ANI. A terminating ANI may be blocked for Visa credit cards, for example, by transferring category code "03" and type code "01" (identifying "Visa" type of credit cards) with the terminating ANI. A terminating ANI may be blocked for all billing products by transferring category "00" (identifying "all" categories) and type "00" (identifying "all" types). The latter example may be alternatively achieved by not transferring any category or type fields.

Before storing the data, a determination is made of whether the terminating ANI is a domestic or an international ANI (step 152). If the ANI is a domestic ANI, then the terminating ANI is stored in the principle area of the enhanced screening database 114, along with the category (or categories) and type (or types) of blocked billing products (step. 154). If the ANI is an international ANI, then the ANI is stored in an international part of the enhanced screening database 114, along with the category (or categories) and type (or types) of blocked billing products (step 156).

Of note, the enhanced screening database includes one or more variable length characters at the end of the terminating ANI when it is stored. Variable length characters may be added automatically by the software to all terminating ANIs as they are stored. The type and length of the characters that are automatically added may be selected from pre-programmed alternatives or re-programmed to include additional options. Alternatively, the variable length characters may be selectively added in accordance with a command input, for example, by a fraud analyst in the fraud control center.

For example, the domestic terminating ANI "800-555-1313" is flagged for storage in the principle portion of the enhanced screening database 114 in step 154, along with a category and type of billing product. The processor may be pre-programmed to store the terminating ANI as "800-555-1313*", were the asterisk signifies any number and combination of subsequent characters. Alternatively, the processor may include the asterisk for this particular terminating ANI, based upon the calling patterns analyzed by the fraud analyst. As described further below, this will block calls made to the terminating ANI (for the category and type of billing product blocked) even if the caller includes bogus characters at the end of the terminating ANI.

Variable length characters may also be pre-programmed or selected so that the fraud flag is set to block more than the particular terminating ANI that generates the alert. For example, the database controller may be pre-programmed to store the above terminating ANI as "800-555-13*". Alternatively, the database may be instructed to include to so store the terminating ANI by the fraud analyst. Storing the terminating ANI in this manner will block all terminating ANIs from 800-555-1300 through 800-555-1399. This may be desirable, for example, where the fraud analyst or the controller software determines that this series of numbers are all assigned to the same PBX system that the hacker is trying to access through the 800-555-1313 terminating ANI.

Such information regarding the range of terminating ANIs of the PBX system may be found, for example, in a look-up table that is accessed by the analyst or the software. When an analyst is involved, the analyst may determine where and how to set the variable length asterisk to include all of the desired numbers. Where software is involved, a sub-routine in the software may determine where to set the variable length asterisk to include the desired range of terminating ANIs. In either case, more than one variable length terminating ANI might be necessary. For example, where the PBX system includes terminating ANIs from 800-555-1300 through 800-555-1319, terminating ANIs 800-555-130* and 800-555-131* may be stored.

The same type of variable length storage may be applied to block international terminating ANIs that are flagged for storage in the international part of the enhanced screening database 114. Thus, for the international terminating ANI "011-86-432-3211", the ANI "011-86-432-3211*" may be stored, where the asterisk signifies any number and combination of subsequent characters. As described further below, this will block calls to the terminating ANI (for the category and type of billing product blocked) where the caller includes bogus characters at the end of the terminating ANI. Variable length characters may also be pre-programmed or selected so that the fraud flag is set to block more than the particular ANI that generates the alert. For example, storing the ANI "011-86-432-32*" would block calls to international terminating ANIs "011-86-42-3200" through "011-86-42-3299".

Figure 4:
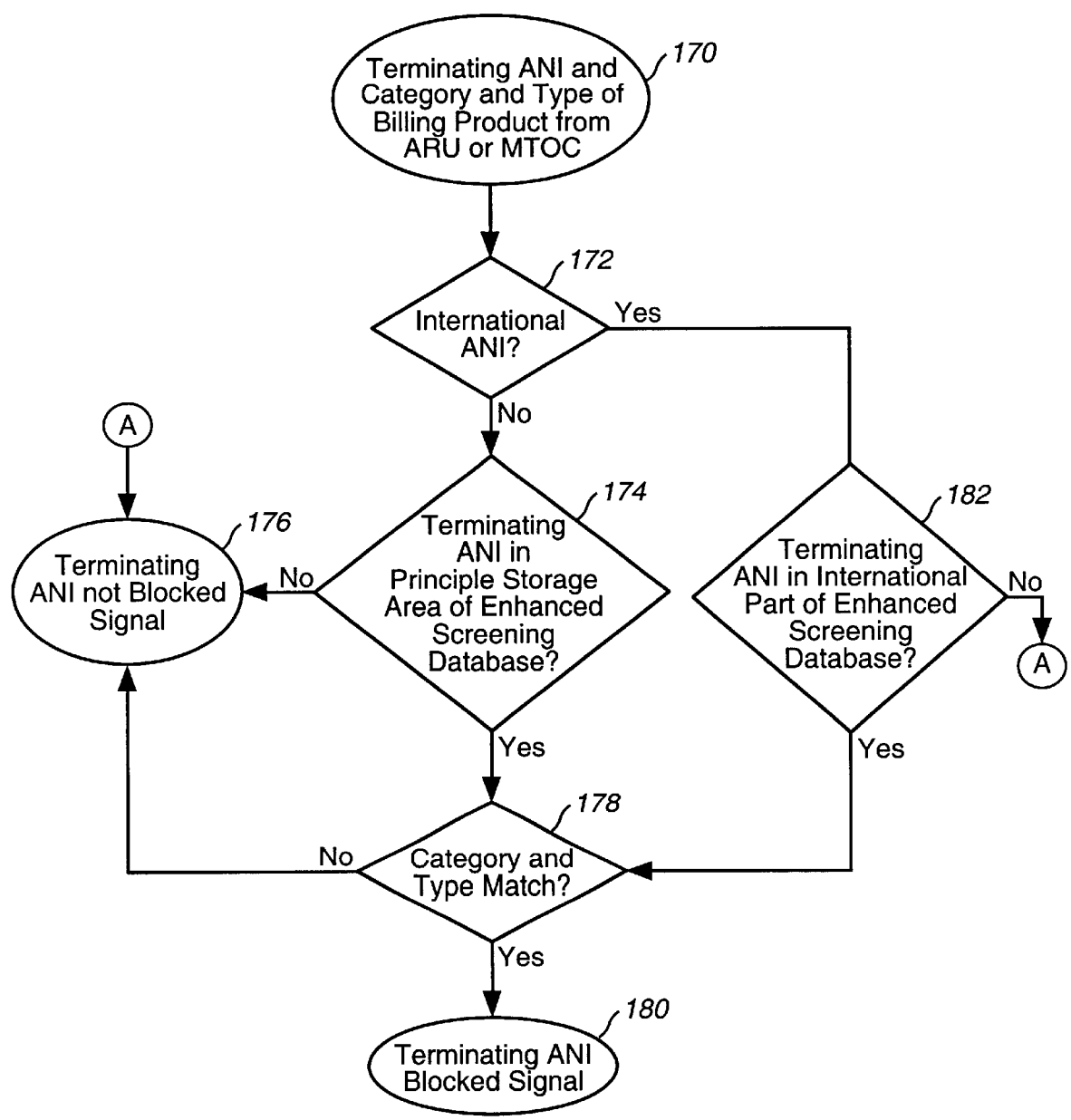
FIG. 4 is a flowchart of the processing of a call by the screening database of FIG. 2 where a call is placed to a terminating ANI using bogus characters.

Referring back to FIG. 2, a special services call is placed to the ISN 100 via the ARU 126 or the MTOC 122. Before the call is connected, the enhanced screening database is checked for the terminating ANI of the call, to determine whether the terminating ANI is blocked. FIG. 4 is a flowchart of steps followed for determining whether the terminating ANI is found in the enhanced screening database 114. First, the terminating ANI and the category and type of billing product used to place the call is transferred from the ARU 126 or MTOC 122 to the processor or computer associated with the enhanced screening database 114 via the ethernet rail 130 (step 170). Next, a determination is made of whether the terminating ANI is a domestic ANI or an international ANI. In the U.S., an "011" will be entered at the ARU 126 or MTOC 122 at the beginning of an international terminating ANI. Thus, ARU 126 or MTOC 122 may set a flag when the "011" prefix is detected, and send the flag along with the terminating ANI. For example, a "0" flag detected at step 172 may indicate a domestic ANI whereas a "1" flag detected at step 172 may indicate an international ANI. Alternatively, the entire terminating ANI (including the "011" prefix) may be sent from the ARU 126 or the MTOC 122 and the processor determines whether it is a domestic or international ANI based on the absence or presence of the "011" prefix.

Where the terminating ANI is a domestic ANI, the principle storage area of the database is searched to determine if the terminating ANI is located therein (step 174). Further details of this step will be given below. In the nominal case, the domestic terminating ANI received will have ten numbers (area code and seven digit local exchange and number), and will be compared with the terminating ANIs in the principle area of the database to determine if there is a match. If the terminating ANI is not found in the database, then the processor returns a "terminating ANI not blocked signal" to the ARU 126 or MTOC 122 (step 176). If the terminating ANI is found in the database, then the category (or categories) and type (or types) of billing products blocked for the terminating ANI are retrieved from the database and compared with the category and type of billing product used to make the special services call (step 178). If there is no match, then the terminating ANI is not blocked for the category and type of billing product being used to make the call and the controller again returns a "terminating ANI not blocked signal" to the ARU 126 or MTOC 122 (step 176). If there is a match, then the controller returns a "terminating ANI blocked signal" to the ARU 126 or MTOC 122 (step 180).

Where the terminating ANI is an international ANI, the international part of the database is searched to determine if the terminating ANI is located therein (step 182). Further details of this step will also be given below. Generally, the international terminating ANI received will be compared with the terminating ANIs in the international part to determine if there is a match. If the terminating ANI is not found in the database, then the controller returns a "terminating ANI not blocked signal" to the ARU 126 or MTOC 122 (step 176). If the terminating ANI is found in the database, then the category (or categories) and type (or types) of billing products blocked for the terminating ANI are retrieved from the database and compared with the category and type of billing product used to make the special services call (step 178). If there is no match, then the terminating ANI is not blocked for the category and type of billing product being used to make the call and the controller again returns a "terminating ANI not blocked signal" to the ARU 126 or MTOC 122 (step 176). If there is a match, then the controller returns a "terminating ANI blocked signal" to the ARU 126 or MTOC 122 (step 180).

Referring again to step 174 of FIG. 4, the determination is made regarding whether the domestic terminating ANI that is dialed is found in the principle storage area of the enhanced screening database. The terminating ANI dialed may be, for example, "800-555-1313-9999", where the sequence "9999" are bogus characters added by the caller to avoid a block. If the terminating ANI that is stored in the enhanced screening database is "800-555-1313" and the comparison made is number-per-number in step 174, there will be no match between the stored ANI and the dialed ANI. Step 174 will thus be followed by step 176, where a not blocked signal is returned.

However, if the blocked terminating ANI has been stored as "800-555-1313*" as described above, there will be a match in step 174. The first 10 digits of the dialed terminating ANI will match the stored terminating ANI. Since the asterisk in the stored terminating ANI will create a match between any number and combination of subsequent characters, such as "9999", a match will be found between the stored terminating ANI "800-555-1212*" and the dialed terminating ANI "800-555-1313-9999". Step 178 will thus follow step 174 and, if the category and type match, a block signal will be returned (step 180).

A match will also be returned in step 174 if the blocked terminating ANI has been stored as "800-555-13*", as described above. The first 8 digits of the dialed terminating ANI will match the stored terminating ANI. Since the asterisk in the stored terminating ANI will match any number and combination of subsequent characters, it will match the dialed terminating ANI "800-555-1313-9999". The block will also prevent the hacker from gaining access to other lines of the PBX, for example, by dialing the terminating ANI "800-555-1324" or "800-555-1324-9999".

Alternative types of variable length characters are contemplated. For example, a "%" character may represent any one character and the stored terminating ANI may be "800-555-1313%%%%". This would also create a match with the dialed terminating ANI "800-555-1313-9999", since each "%" character would match a "9".

A similar outcome will occur where variable length characters are used to store international terminating ANIs in the international part of the enhanced screening database. Referring to step 182 of FIG. 4, the determination is made regarding whether an international terminating ANI dialed is found in the international part of the enhanced screening database. The terminating ANI dialed may be, for example, "011-86-432-3211-9999", where the sequence "9999" is added by the caller to avoid a block. If the terminating ANI that is stored in the international part of the enhanced screening database is "011-86-432-3211" and the comparison in step 182 is made between each number of the stored ANI and the dialed ANI, there will be no match Step 182 will thus be followed by step 176, where a not blocked signal is returned.

However, if the blocked terminating ANI has been stored as "011-86-432-3211*" as described above, there will be a match in step 182. The first 12 digits of the dialed terminating ANI will match the stored terminating ANI. Since the asterisk in the stored terminating ANI will match any number and combination of subsequent characters, such as "9999", it will create a match with the dialed terminating ANI "011-86-432-3211-9999". Step 178 will thus follow step 182 and, if the category and type match, a block signal will be returned (step 180).

A match will also be returned in step 174 if the blocked terminating ANI has been stored as "011-86-432-32*", as described above. The first 8 digits of the dialed terminating ANI will match the stored terminating ANI. Since the asterisk in the stored terminating ANI will match any number and combination of subsequent characters, it will match the dialed terminating ANI "011-86-432-3211-9999".

Although the enhanced screening database has been described above as having a principle (domestic) storage area and an international storage area (or part), both types of numbers may be stored together in one general area of the database. Alternatively, two different databases having different capabilities may separately service domestic and international calls. In that case, one of the two databases (including its associated hardware and software) may not have the capability of storing and/or searching variable length characters. For example, where an older domestic screening database does not have the capability of storing and/or searching variable length characters and an international screening database does, then a caller may defeat a block to a domestic terminating ANI by including bogus characters but will be blocked when making a call to an international terminating ANI using bogus characters.

In addition, the above discussion focused on "storage" of one or more variable length characters with the terminating ANI in the screening database. Alternative methods and processing can accomplish the same result. For example, the terminating ANI stored in the screening database may be "800-555-1313" and the processing in step 174 of FIG. 4 (for example) may be a determination of whether the first 10 characters of the dialed terminating ANI match an ANI in the database. Thus, for the dialed terminating ANI "800-555-1313-9999", a match would be found since the first 10 digits of the dialed terminating ANI match the stored terminating ANI. Thus, the software used to determine a match between a dialed ANI and the stored ANIs may effectively ignore the bogus characters included in the dialed ANI.

What is claimed is:

1. A system for preventing telecommunications fraud, the system comprising:
    a database configured to store numbers representing a terminating automatic number indicator (ANI) that has generated a fraud alert; and
    a processor configured to initiate blocking of calls directed at the terminating ANI based on the stored numbers, wherein the stored numbers includes a portion of the terminating ANI and a variable length character that represents any corresponding and subsequent characters of the terminating ANI.

2. The system as in claim 1, wherein the processor receives a dialed terminating ANI and compares the dialed terminating ANI with the stored number, the variable length character matching any corresponding character in the dialed terminating ANI.

3. The system as in claim 2, wherein one or more categories and types of billing products are associated with the stored number.

4. The system as in claim 3, wherein the dialed terminating ANI is associated with a category and type of billing product.

5. The system as in claim 4, wherein a block call signal is generated if there is a match between the dialed terminating ANI and the stored number, and between the category and type of billing product associated with the dialed terminating ANI and one of the one or more categories and types of billing products associated with the matching stored number.

6. The system as in claim 2, wherein the database includes a principle storage area that stores numbers corresponding to domestic terminating ANIs and a secondary storage area that stores numbers corresponding to international terminating ANIs.

7. A system for preventing telecommunications fraud, the system comprising:
   a database configured to store terminating ANIs that have generated a fraud alert; and
   a processor configured to receive a dialed terminating ANI and to determine if leading characters of the dialed terminating ANI match one of the stored terminating ANIs, wherein a match between the dialed terminating ANI and the stored terminating ANI initiating a block of the dialed call, the stored terminating ANI including a character that represents any corresponding and subsequent characters of the terminating ANI.

8. The system as claim 7, wherein a block call signal is generated if there is a match between the dialed terminating ANI and a stored terminating ANI.

9. The system as in claim 7, wherein one or more categories and types of billing products are associated with each stored terminating ANI in the database.

10. The system as in claim 10, wherein the dialed terminating ANI input to the database has an associated a category and type of billing product.

11. The system as in claim 10, wherein a block call signal is generated if there is a match between the dialed terminating ANI and a stored terminating ANI, and between the category and type of billing product associated with the dialed terminating ANI and one of the one or more categories and types of billing products associated with the matching terminating ANI.

12. A method of preventing fraud comprising the steps of:
   receiving and storing all of the characters of terminating ANIs that have generated a fraud alert;
   receiving a dialed terminating ANI representing a subsequently dialed call, wherein the dialed terminating ANI includes bogus characters inserted at the end of the dialed terminating ANI;
   determining if the leading characters of the dialed terminating ANI match the characters of a terminating ANI stored in the database, wherein the bogus characters are excluded from the leading characters of the dialed terminating ANI used in the determination; and
   initiating a block of the dialed call if a match is determined.

13. A method of preventing fraud comprising the steps of:
   storing at least some of the leading characters of terminating ANIs that generate a fraud alert and at least one variable length character that represents any corresponding and subsequent characters of the terminating ANIs;
   receiving a dialed terminating ANI representing a subsequently dialed call;
   determining if the characters of the dialed terminating ANI and the stored characters of a terminating ANI match; and
   initiating a block of the dialed call if a match is determined.

14. A method of blocking a call, the method comprising:
   receiving dialed digits associated with the call;
   comparing the dialed digits including bogus digits with a predetermined pattern of digits associated with a fraud alert, wherein the predetermined pattern of digits is represented, in part, by a character representing a string of one or more digits, the character encompassing the bogus digits; and
   initiating blocking of the call based on the comparison.

15. A method of blocking a call, the method comprising:
   receiving dialed digits associated with the call;
   comparing the dialed digits with a predetermined pattern of digits associated with a fraud alert, wherein the predetermined pattern of digits is represented, in part, by multiple characters corresponding to multiple ones of the digits including bogus digits; and
   initiating blocking of the call based on the comparison.

* * * * *